HEAT DISSIPATOR FOR ELECTRONIC CIRCUITRY

Filed Nov. 13, 1963

INVENTOR.
EDMUND G. TRUNK
BY James and Franklin
ATTORNEYS 3,261,396

HEAT DISSIPATOR FOR ELECTRONIC CIRCUITRY

Edmund G. Trunk, East Meadow, N.Y., assignor to The Staver Company Incorporated, Bay Shore, N.Y., a corporation of New York Filed Nov. 13, 1963, Ser. No. 323,369
12 Claims. (Cl. 165—80)

This invention relates to heat dissipators, and more particularly to heat dissipators for electronic circuitry.

Electronic apparatus increasingly employs components which are small in dimension, but which generate and dissipate considerable heat. This is true of solid state diodes, rectifiers, and transistors. It has led to the growing use of accessories, variously known as "heat sink," "heat radiator," or "heat dissipator." The primary object of the present invention is to generally improve such heat dissipators intended for use in direct association with electronic components.

It is already known to make a dissipator having a large area radiating surface provided by corrugated sheet metal secured to a deck, a part of which serves as a mounting area for a transistor. (In the following description the term "transistor" is used for convenience, but the term is intended to include other solid state components such as diodes, rectifiers, silicon controlled rectifiers, and so on, which are mounted in the same way on the deck.) Other parts of the deck, usually the ends are bent and shaped to act as support means to support the dissipator on a chassis.

One difficulty which arises in the use of transistors is that the case of the transistor usually is at high voltage, that is, electrically "hot," and therefore preferably should be insulated from the chassis and/or heat sink. For this purpose it has been customary to employ wafers of mica for insulation purposes, but it is troublesome to use these, and they must be provided in a variety of patterns and sizes to fit different components. Even more important, the mica resists heat transfer and therefore reduces the effectiveness of the heat sink.

The general object of the present invention is to improve heat sinks. A more specific object is to improve heat sinks of the type described above.

In accordance with the present invention, some but not all of the parts of the heat dissipator are made of anodized aluminum. The mounting area which receives the transistor is not anodized, so that there is no interference with good heat transfer from the transistor to the heat sink. It is difficult to mask a product which is being anodized, and in accordance with the present invention the heat dissipator preferably is made of multiple parts some of which are anodized and others are not.

To accomplish the foregoing general objects, and other more specific objects which will hereinafter appear, my invention resides in heat dissipator elements and their relation one to another, as are hereinafter more particularly described in the following specification. The specification is accompanied by a drawing in which.

Figures 1, 4:
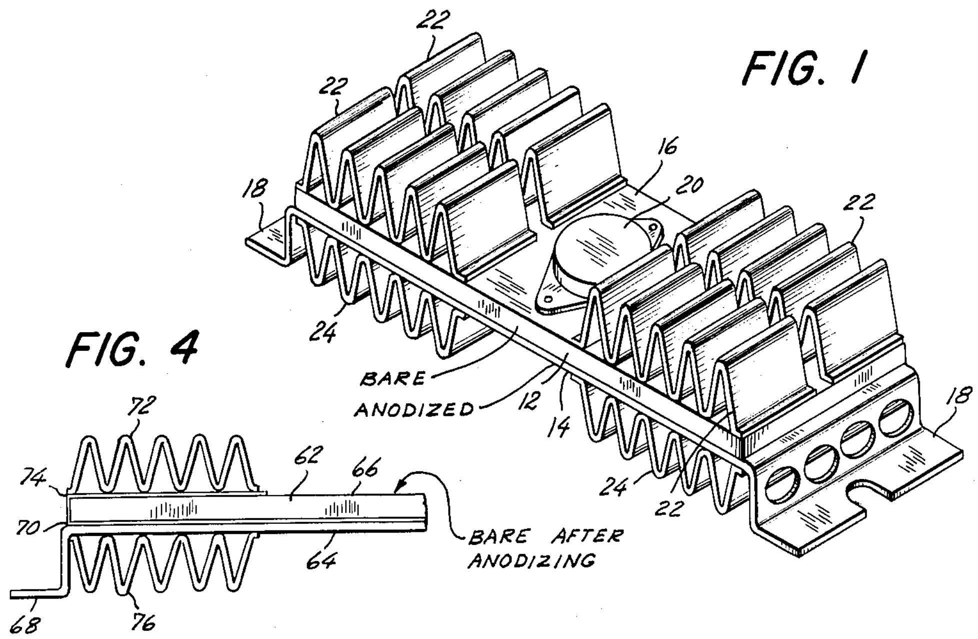
FIG. 1 is a perspective view showing a heat dissipator embodying features of my invention.
FIG. 4 is a fragmentary elevation showing another heat dissipator.

Referring to the drawing, and more particularly to FIG. 1, the heat dissipator there shown comprises a plurality of metal parts 12 and 14. The part 12 has a transistor mounting area 16. The part 14 has parts 18 for supporting the dissipator on an electronic circuitry chassis. The part 14 is made of aluminum and is anodized. Because it is anodized there is electrical insulation between the parts 12 and 14, and also between the parts 18 and the chassis. The part 12 is not anodized, and might even be made of some other metal than aluminum. The power transistor 20 has a case which is electrically "hot," and yet it is secured directly to the surface 16 of part 12 for maximum heat transfer. There is no need to use the usual mica wafer between the transistor 20 and the part 12, and no such wafer is employed.

In the particular form here shown, the part 12 may be termed a "deck," and the part 14 a "base," these being laminated together in suitable manner, preferably by means of a cement or adhesive. The dissipator further comprises fins 22 secured on top of deck 12, and fins 24 secured beneath the base 14. Either set of fins could be used, instead of both as here shown, depending on the area needed. In the convenient form illustrated, the fins are deeply corrugated sheet metal. They are preferably made of thin sheet aluminum, although another metal might be used because they need not be anodized. The supports 18 are deeper in depth than the corrugations 24.

Figures 2, 5:
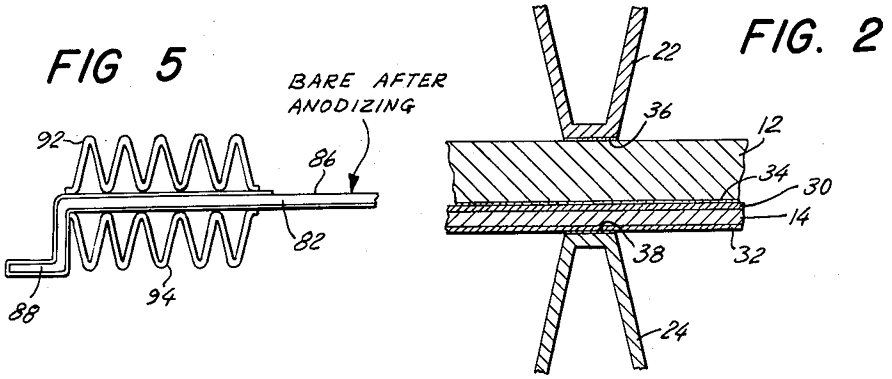
FIG. 2 is a fragmentary section drawn to enlarged scale and explanatory of the invention.
FIG. 5 is a similar view showing still another heat dissipator embodying features of the invention.

Referring now to FIG. 2, the base 14 is anodized, the resulting coating being indicated at 30 and 32. This may be quite thin, say 0.001″ thick, and yet affords excellent electrical insulation. The deck 12 is not anodized, and is secured to the base 14, as by means of a thin layer of epoxy cement indicated at 34. The corrugated metal 22 is secured to deck 12, preferably by means of an epoxy cement 36. The cement 36 preferably is loaded with metal particles. Powdered aluminum is preferred, and its use improves the heat transfer between deck 12 and the fins 22. The fins 22 could be secured to the deck in more conventional fashion, as by means of welding, soldering, brazing, or the like, or by epoxy cement which is not loaded. The cement between deck 12 and base 14 may be loaded, but the advantage of improved heat transfer then is offset by the disadvantage of reduced electrical insulation, in the event of a defect in the anodized film.

The bottom fin structure 24 is similarly secured to the bottom of base 14, the epoxy loaded with metal particles being indicated at 38. The films 30 and 32 introduce some thermal resistance, but because they are so thin, and beacause a large transfer area is provided, the thermal resistance is not serious. The situation differs at the transistor, where all of the heat transfer is concentrated in a small area.

Figure 3:
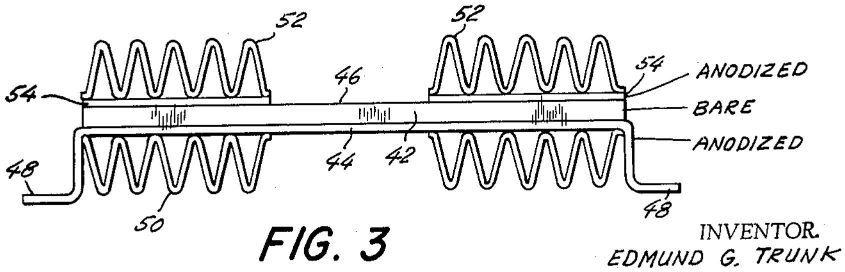
FIG. 3 is an elevation of a modified form of heat dissipator.

If it be desired to electrically insulate the top fin structure as well as the bottom fin structure, this may be done by the addition of separator sheets, shown in FIG. 3. Here again there is an unanodized deck 42, preferably made of heavy gauge aluminum, and a base 44 of lighter gauge aluminum, the latter being anodized. The transistor mounting area 46 is bare for maximum heat transfer from a transistor mounted thereon. The "hot" electrical potential is insulated from the chassis by reason of the anodized film between deck 42 and base 44, and again between the supports 48 of the base and the chassis on which the dissipator is mounted.

The fin structure 50 is secured beneath the base 44 as previously described. However in this case the top fin structure 52 is not secured directly on top of the base 42, and instead thin separator sheets 54 are interposed. The sheets 54 are made of aluminum which is anodized, and thus the fin structure 52 is electrically insulated from the deck 42.

The dissipators as so far described are considered preferable, but it is possible to accomplish the intended objective in other ways.

Referring to FIG. 4, the deck 62 is made of aluminum and is laminated to a base 64 having supports 68 at both ends, although only one end of the structure is shown in FIG. 4. In this case, the deck 62 is anodized, and the base 64 is not. The anodized film 70 insulates the deck from the base. The top fin structure 72 is insulated from deck 62 by the anodized film 74. The bottom fin structure 76 is secured to the base 64 and is therefore not at high potential. The transistor mounting part 66 is bare. Because it is difficult to mask part of an aluminum piece which is being anodized, the anodized coating may be ground away at the transistor mounting area 66.

Still another form of the invention is shown in FIG. 5 in which the deck and base combination are integral. The deck portion is marked 82, and the supports which are secured to the chassis are marked 88. Here again only one end of the structure is shown. The integral deck-base is anodized, and is thereby insulated from the chassis at the supports 88. The fin structures 92 and 94 are also at low electrical potential. The transistor mounting area 86 is unanodized or bare. Here again this may be accomplished in any desired fashion, as by masking if feasible, but in the present state of the art it preferably is bared by grinding away the anodized coating at the transistor mounting area.

In general aluminum is a good metal for the present purpose, even for parts which are not anodized, because it is a good heat conductor; it is light in weight; it is easily formed; and it is low in cost. If desired, the fins may be coated black for improved heat radiation. I prefer arrangements as in FIGS. 1 and 3, in which no masking or grinding is required.

It is believed that the construction and method of use of my improved heat dissipator for electronic circuitry, as well as the advantages thereof, will be apparent from the foregoing detailed description. It will also be apparent that while I have shown and described the invention in several preferred forms, changes may be made in the structures shown without departing from the scope of the invention, as sought to be defined in the following claims. In the claims the reference to a "transistor" is merely for convenience, and is not intended to exclude other solid state semiconductors such as diodes, rectifiers, and silicon controlled rectifiers.

I claim:

1. A heat dissipator for a transistor, said dissipator comprising a plurality of metal portions, one of said metal portions having a bare transistor mounting area, another metal part acting as support means for supporting said dissipator on a chassis on which it is to be used, said latter portion being made of aluminum and being anodized to provide electrical insulation between the transistor to be used and a chassis on which it is to be mounted, and metal fins secured to the anodized portion of the dissipator.

2. A heat dissipator for a transistor, said dissipator comprising a combined deck and base formed of sheet aluminum, said deck-base having a base transistor mounting area, deeply corrugated sheet metal secured to said deck-base outside the transistor mounting area, and additional portions of said deck-base acting as support means for supporting said dissipator on a chassis on which it is to be used, surfaces of said deck-base outside said mounting area and including said support means being anodized to provide electrical insulation between the mounting area and a chassis on which it is to be mounted, said corrugated sheet metal fins being unanodized and being secured to anodized surfaces of said deck-base.

3. A heat dissipator for a transistor, said dissipator comprising a combined deck and base, said deck-base comprising a deck made of heavy gauge metal laminated to the deck portion of a base made of aluminum, said deck having a transistor mounting area, sheet metal fins secured to said deck-base outside the transistor mounting area, and additional portions of said base acting as support means for supporting said dissipator on a chassis on which it is to be used, said base but not said deck being anodized to provide electrical insulation between the dissipator and a chassis on which it is to be mounted.

4. A heat dissipator for a transistor, said dissipator comprising a combined deck and base, said deck-base comprising a deck made of heavy gauge metal laminated to the deck portion of a base made of aluminum, said deck having a transistor mounting area, sheet metal fins secured to said deck-base outside the transistor mounting area, and additional portions of said base acting as support means for supporting said dissipator on a chassis on which it is to be used, said base but not said deck being anodized to provide electrical insulation between the dissipator and a chassis on which it is to be mounted, said fins being mounted on the top surface of said deck and on the bottom surface of said base.

5. A heat dissipator for a transistor, said dissipator comprising a combined deck and base formed of aluminum, said deck-base comprising a deck made of heavy gauge sheet aluminum laminated to the deck portion of a base made of aluminum, said deck having a transistor mounting area, deeply corrugated sheet metal secured to said deck and base outside the transistor mounting area, portions of said base acting as support means for supporting said dissipator on a chassis on which it is to be used, said base but not said deck being anodized to provide electrical insulation between the dissipator and a chassis on which it is to be mounted.

6. A heat dissipator for a transistor, said dissipator comprising a combined deck and base formed of sheet aluminum, said deck-base comprising a deck made of heavy gauge sheet aluminum laminated to the deck portion of a base made of sheet aluminum, said deck having a transistor mounting area, deeply corrugated sheet metal secured to said deck and base outside the transistor mounting area, portions of said base acting as support means for supporting said dissipator on a chassis on which it is to be used, said base but not said deck being anodized to provide electrical insulation between the dissipator and a chassis on which it is to be mounted, said corrugated sheet metal being unanodized and being secured to the upper face of the deck and to the lower face of the base.

7. A heat dissipator for a transistor, said dissipator comprising a combined deck and base, said deck-base comprising a deck made of heavy gauge sheet metal laminated on top of the deck portion of a base made of sheet aluminum, said deck having a transistor mounting area, separator sheets of aluminum laminated on top and forming a part of the deck outside the transistor mounting area, sheet metal fins secured to the top of the separator sheets, portions of said base acting as support means for supporting said dissipator on a chassis on which it is to be used, said base and said separator sheets but not said deck being anodized to provide electrical insulation between the deck and the fins and a chassis on which the dissipator is to be mounted.

8. A heat dissipator for a transistor, said dissipator comprising a combined deck and base, said deck-base comprising a deck made of heavy gauge sheet metal laminated on top of the deck portion of a base made of sheet aluminum, said deck having a transistor mounting area, separator sheets of aluminum laminated on top of and forming a part of the deck outside the transistor mounting area, sheet metal fins secured to the bottom of said deck and to the top of the separator sheets, portions of said base acting as support means for supporting said dissipator on a chassis on which it is to be used, said base and said separator sheets but not said deck being anodized to provide electrical insulation between the deck and the fins and a chassis on which the dissipator is to be mounted, the deck and base and fins being joined by an epoxy cement loaded with metal particles.

9. A heat dissipator for a transistor, said dissipator comprising a combined deck and base, said deck-base comprising a deck made of heavy gauge sheet metal laminated on top of the deck portion of a base made of sheet aluminum, said deck having a transistor mounting area, separator sheets of aluminum laminated on top of and forming a part of the deck outside the transistor mounting area, sheet metal fins secured to the bottom of said deck and to the top of the separator sheets, portions of said base acting as support means for supporting said dissipator on a chassis on which it is to be used, said base and said separator sheets but not said deck being anodized to provide electrical insulation between the deck and the fins and a chassis on which the dissipator is to be mounted, said fins being unanodized.

10. A heat dissipator for a transistor, said dissipator comprising a combined deck and base formed of sheet aluminum, said deck-base comprising a deck made of heavy gauge sheet aluminum laminated on top of the deck portion of a base made of sheet aluminum, said deck having a transistor mounting area, separator sheets of aluminum laminated on top of and forming a portion of the deck outside the transistor mounting area, deeply corrugated sheet metal secured to the top of the separator sheets, portions of said base acting as support means for supporting said dissipator on a chassis on which it is to be used, said base and said separator sheets but not said deck being anodized to provide electrical insulation between the deck and the corrugated sheet metal and a chassis on which the dissipator is to be mounted.

11. A heat dissipator for a transistor, said dissipator comprising a combined deck and base formed of sheet aluminum, said deck-base comprising a deck made of heavy gauge sheet aluminum laminated on top of the deck portion of a base made of sheet aluminum, said deck having a transistor mounting area, separator sheets of aluminum laminated on top of and forming a portion of the deck outside the transistor mounting area, deeply corrugated sheet metal secured to the bottom of said deck and to the top of the separator sheets, portions of said base acting as support means for supporting said dissipator on a chassis on which it is to be used, said base and said separator sheets but not said deck being anodized to provide electrical insulation between the deck and the corrugated sheet metal and a chassis on which the dissipator is to be mounted, the deck and base and fins being joined by an epoxy cement loaded with metal particles.

12. A heat dissipator for a transistor, said dissipator comprising a combined deck and base formed of sheet aluminum, said deck-base comprising a deck made of heavy gauge sheet aluminum laminated on top of the deck portion of a base made of sheet aluminum, said deck having a transistor mounting area, separator sheets of aluminum laminated on top of and forming a portion of the deck outside the transistor mounting area, deeply corrugated sheet metal secured to the bottom of said deck and to the top of the separator sheets, portions of said base acting as support means for supporting said dissipator on a chassis on which it is to be used, said base and said separator sheets but not said deck being anodized to provide electrical insulation between the deck and the corrugated sheet metal and a chassis on which the dissipator is to be mounted, said corrugated sheet metal being unanodized.

References Cited by the Examiner

UNITED STATES PATENTS

| | | | |
|---|---|---|---|
| 2,328,488 | 8/1943 | Peters | 317—234 |
| 2,772,382 | 11/1956 | Escoffery | 317—234 |
| 2,965,819 | 12/1960 | Rosenbaum | 317—234 X |
| 2,984,774 | 5/1961 | Race | 317—234 |
| 3,075,360 | 1/1963 | Elfving et al. | 62—3 |
| 3,086,283 | 4/1963 | Webber et al. | 165—80 X |
| 3,180,404 | 4/1965 | Nelson et al. | 165—47 |
| 3,182,115 | 5/1965 | Moran et al. | 165—133 X |

FOREIGN PATENTS

| | | |
|---|---|---|
| 117,674 | 10/1943 | Australia. |

ROBERT A. O'LEARY, *Primary Examiner.*

CHARLES SUKALO, FREDERICK L. MATTESON, Jr., *Examiners.*

A. W. DAVIS, *Assistant Examiner.*